United States Patent
Park et al.

(10) Patent No.: US 12,400,794 B2
(45) Date of Patent: Aug. 26, 2025

(54) CERAMIC ELECTRONIC COMPONENT

(71) Applicant: SAMSUNG ELECTRO-MECHANICS CO., LTD., Suwon-si (KR)

(72) Inventors: Jin Soo Park, Suwon-si (KR); Jong Ho Lee, Suwon-si (KR); Kang Ha Lee, Suwon-si (KR); Yoon A Park, Suwon-si (KR); Eui Hyun Jo, Suwon-si (KR); Myung Jun Park, Suwon-si (KR); Hyun Hee Gu, Suwon-si (KR); Woo Kyung Sung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 86 days.

(21) Appl. No.: 17/969,962

(22) Filed: Oct. 20, 2022

(65) Prior Publication Data

US 2023/0187138 A1 Jun. 15, 2023

(30) Foreign Application Priority Data

Dec. 9, 2021 (KR) .................. 10-2021-0175711

(51) Int. Cl.
*H01G 4/30* (2006.01)
*H01G 4/232* (2006.01)

(52) U.S. Cl.
CPC ............ *H01G 4/2325* (2013.01); *H01G 4/30* (2013.01)

(58) Field of Classification Search
CPC ........ H01G 4/30; H01G 4/2325; H01G 4/228; H01G 4/248

(Continued)

(56) References Cited

U.S. PATENT DOCUMENTS

2011/0122540 A1* 5/2011 Ogawa .............. H01G 4/30
  361/305
2013/0182368 A1* 7/2013 Jeon .................. H01G 4/12
  361/301.4

(Continued)

FOREIGN PATENT DOCUMENTS

JP 2018-101724 A 6/2018
JP 2020-119991 A 8/2020

(Continued)

OTHER PUBLICATIONS

Korean Notice of Reason for Rejection dated Apr. 29, 2025 issued in Korean Patent Application No. 10-2021-0175711 (with English translation).

*Primary Examiner* — Arun Ramaswamy
(74) *Attorney, Agent, or Firm* — Morgan Lewis & Bockius LLP (57) ABSTRACT

A ceramic electronic component, includes: a body including a dielectric layer and first and second internal electrodes, the body having first and second surfaces, third and fourth surfaces, and fifth and sixth surfaces; a first external electrode disposed on the first surface, and extending onto a portion of each of the third to sixth surfaces; a second external electrode disposed on the second surface, and extending onto a portion of each of the third to sixth surfaces, wherein, in at least one of cross-sections in first and second directions or in first and third directions, in at least one of the first and second external electrodes, a maximum thickness in a peripheral portion of the first and second surfaces is greater than a maximum thickness in a center portion, and a maximum thickness in a center portion is greater than a maximum thickness in a corner portion.

19 Claims, 8 Drawing Sheets

(58) Field of Classification Search
USPC .................. 361/301.4, 306.3, 321.1, 321.3
See application file for complete search history.

(56) References Cited

U.S. PATENT DOCUMENTS

| | | | |
|---|---|---|---|
| 2013/0242456 A1* | 9/2013 | Lee .......................... | H01G 4/30 |
| | | | 361/301.4 |
| 2016/0351332 A1 | 12/2016 | Lee et al. | |
| 2017/0271083 A1* | 9/2017 | Makino .................... | H01G 4/30 |
| 2018/0082792 A1* | 3/2018 | Satoh ...................... | H01G 4/232 |
| 2018/0174753 A1* | 6/2018 | Terashita ................ | H01G 4/008 |
| 2019/0074138 A1* | 3/2019 | Song ....................... | H01G 4/008 |
| 2019/0103225 A1* | 4/2019 | Han ....................... | H01G 4/2325 |
| 2020/0118754 A1* | 4/2020 | Seo ........................ | H01G 4/2325 |
| 2020/0234887 A1 | 7/2020 | Muramatsu | |
| 2020/0411245 A1* | 12/2020 | Lee ......................... | H01G 4/248 |
| 2021/0057161 A1* | 2/2021 | Zenzai .................... | H01G 4/232 |

FOREIGN PATENT DOCUMENTS

| | | |
|---|---|---|
| KR | 10-2016-0139932 A | 12/2016 |
| KR | 10-2018-0084030 A | 7/2018 |

\* cited by examiner

CERAMIC ELECTRONIC COMPONENT

CROSS-REFERENCE TO RELATED APPLICATION

The present application claims the benefit of priority to Korean Patent Application No. 10-2021-0175711 filed on Dec. 9, 2021 in the Korean Intellectual Property Office, the entire disclosure of which is incorporated herein by reference.

TECHNICAL FIELD

The present disclosure relates to a ceramic electronic component, for example, a multilayer ceramic capacitor (MLCC).

BACKGROUND

Due to the recent miniaturization of IT products, miniaturization of MLCCs used in products is also required. Meanwhile, in the case of an external electrode coating method currently applied to a MLCC, a center portion of the external electrode formed by applying the same may have a shape that is thick in a center portion and which becomes thinner toward the outside. In this case, not only is there a limit to thinning the MLCC, but also, deterioration of reliability due to breakage of the plating layer during plating, the generation of tombstone defects, defects due to measurement chamfering, and the like, may occur.

SUMMARY

An aspect of the present disclosure is to provide a ceramic electronic component capable of being thinned.

Another aspect of the present disclosure is to provide a ceramic electronic component capable of improving reliability deterioration, measurement chamfering, tombstone, and the like.

Another aspect of the present disclosure is to provide a ceramic electronic component capable of being mounted vertically.

One of several solutions proposed through the present disclosure is to change a shape of an external electrode by changing a coating method of a base electrode layer.

According to an aspect of the present disclosure, a ceramic electronic component, includes: a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode disposed on the first surface, and extending onto a portion of each of the third to sixth surfaces; and a second external electrode disposed on the second surface, and extending onto a portion of each of the third to sixth surfaces. In at least one of cross-sections in first and second directions or in first and third directions, when maximum thicknesses of the first and second external electrodes at center portions of the first and second surfaces are defined as $T1$ and $T1'$, respectively, maximum thicknesses of the first and second external electrodes at peripheral portions of the first and second surfaces are defined as $T2$ and $T2'$, respectively, and maximum thicknesses of the first and second external electrodes at corner portions, in which the first and second surfaces are connected to the third to sixth surfaces, are defined as $T3$ and $T3'$, respectively, at least one of $T2>T1>T3$ or $T2'>T1'>T3'$ may be satisfied.

According to another aspect of the present disclosure, a ceramic electronic component includes: a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on a first center region and a first peripheral region of the first surface, a first band portion disposed on a portion of each of the third to sixth surfaces, and a first corner portion connecting the first connection portion and the first band portion; and a second external electrode including a second connection portion disposed on a second center region and a second peripheral region of the second surface, a second band portion disposed on a portion of each of the third to sixth surfaces, and a second corner portion connecting the second connection portion and the second band portion. In at least one of cross-sections in first and second directions or in first and third directions, maximum thicknesses of the first and second connection portions at the first and second peripheral regions are greater than maximum thicknesses of the first and second connection portions at the first and second center regions, respectively. Each of the first and second external electrodes may be a single electrode layer.

According to still another aspect of the present disclosure, a ceramic electronic component includes: a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode disposed on the first surface, and extending onto a portion of at least one of the third to sixth surfaces; and a second external electrode disposed on the second surface, and extending onto a portion of the at least one of the third to sixth surfaces. When maximum thicknesses of the first and second external electrodes at center portions of the first and second surfaces are defined as $T1$ and $T1'$, respectively, maximum thicknesses at peripheral portions of the first and second surfaces are defined as $T2$ and $T2'$, respectively, and maximum thicknesses at corner portions, in which the first and second surfaces are connected to the at least one of the third to sixth surfaces, are defined as $T3$ and $T3'$, respectively, at least one of a condition ($T2$ is greater than $T1$ and $T3$) or a condition ($T2'$ is greater than $T1'$ and $T3'$) is satisfied.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described in detail with reference to the accompanying drawings. The present disclosure may, however, be exemplified in many different forms and should not be construed as being limited to the specific embodiments set forth herein, but should be understood to include various modifications, equivalents, and/or alternatives to the embodiments of the present disclosure. In relation to the description of the drawings, similar reference numerals may be used for similar components.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the present specification, expressions such as "having", "may have", "comprises", or "may contain" may include a presence of a corresponding feature (e.g., components such as numerical, functions, operations, components, or the like), and a presence of additional feature does not be excluded.

In the present specification, expressions such as "A or B", "at least one of A or/and B", "one or more of A or/and B", or the like may include all possible combinations items listed together. For example, "A or B", "at least one of A and B", or "at least one of A or B" may refer to include cases of (1) at least one A, (2) at least one B, or (3) both including at least one A and at least one B.

In the drawings, a first direction may be defined as a length (L) direction, a second direction may be defined as a thickness (T) direction, and a third direction may be defined as a width (W) direction.

Figure 1:
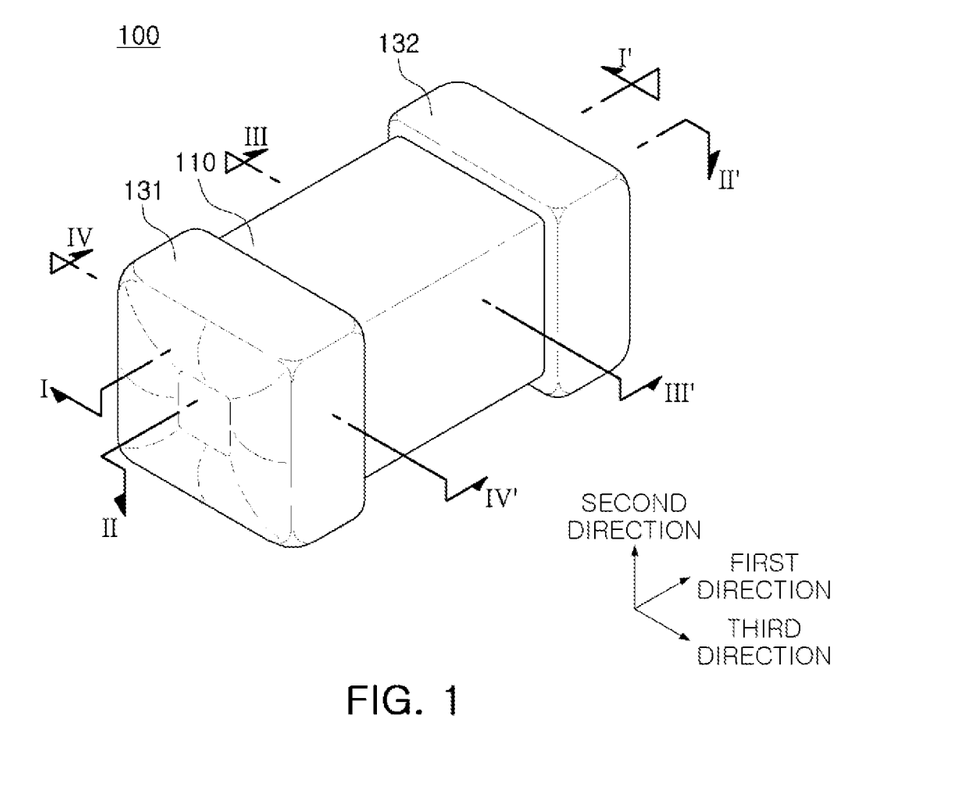
FIG. 1 is a schematic perspective view of a ceramic electronic component according to an example.

FIG. 1 is a schematic perspective view of a ceramic electronic component according to an example.

Figure 2:
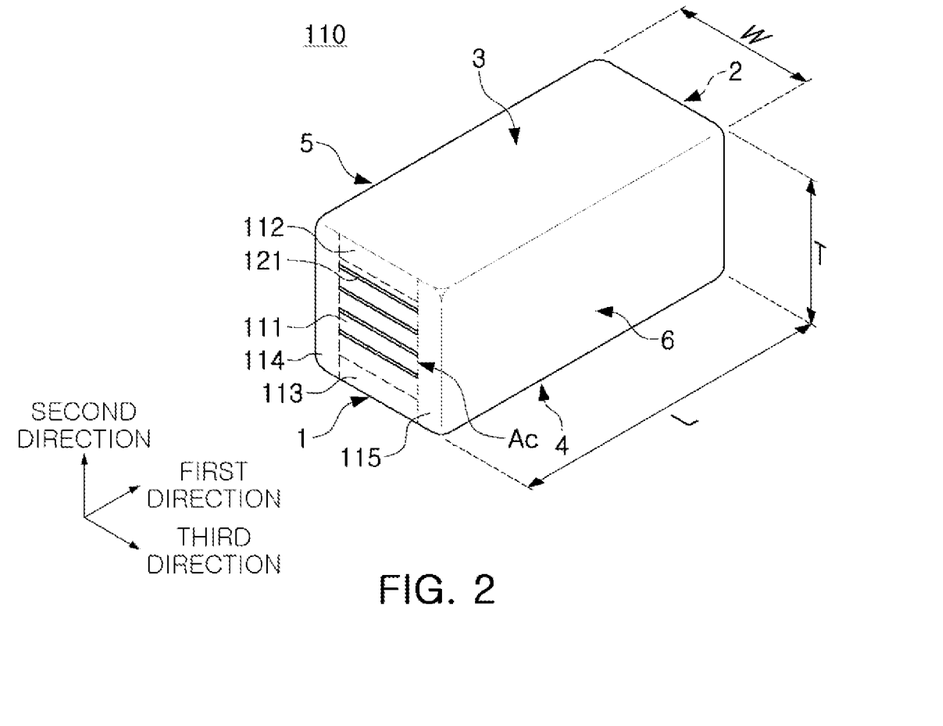
FIG. 2 is a schematic perspective view of a body of the ceramic electronic component of FIG. 1.

FIG. 2 is a schematic perspective view of a body of the ceramic electronic component of FIG. 1.

Figure 3:
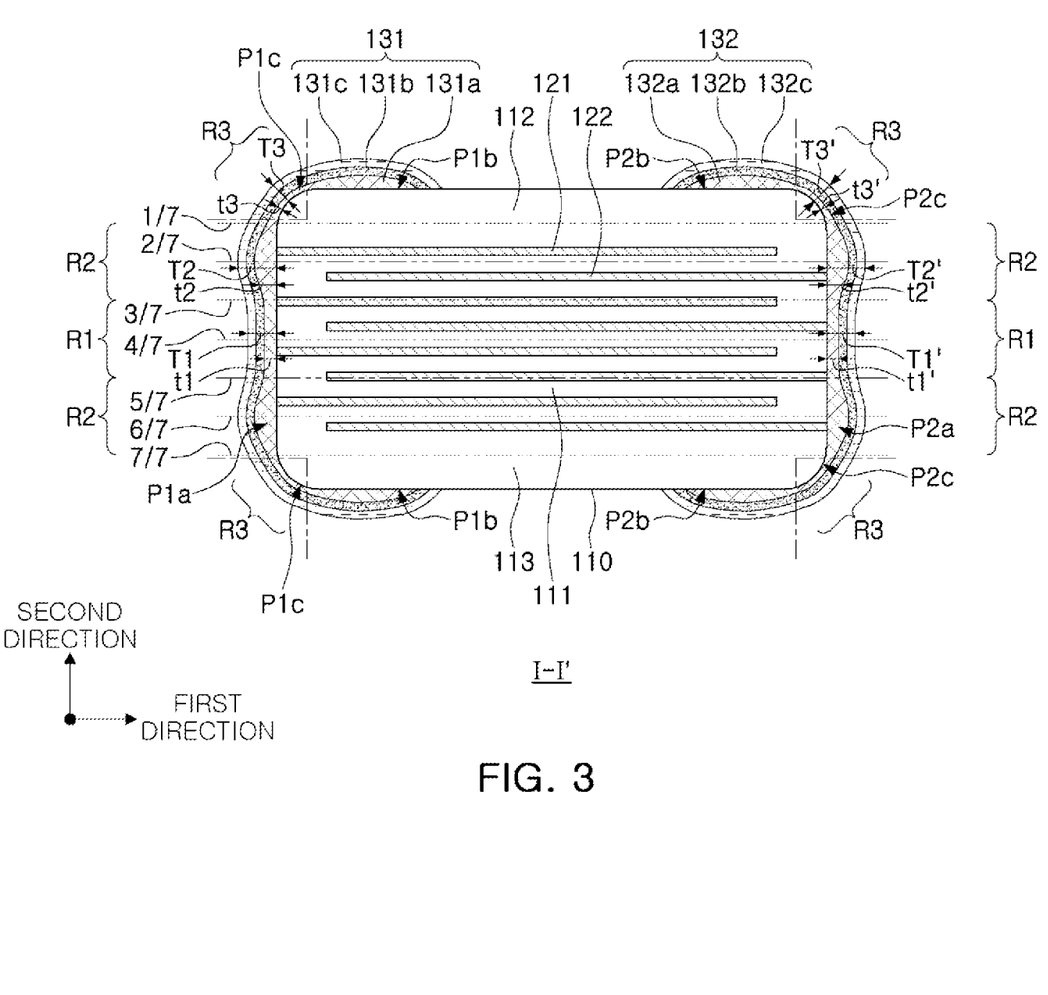
FIG. 3 is a cross-sectional view schematically illustrating a cross-section taken along line I-I' of FIG. 1.

FIG. 3 is a cross-sectional view schematically illustrating a cross-section taken along line I-I' of FIG. 1.

Figure 4:
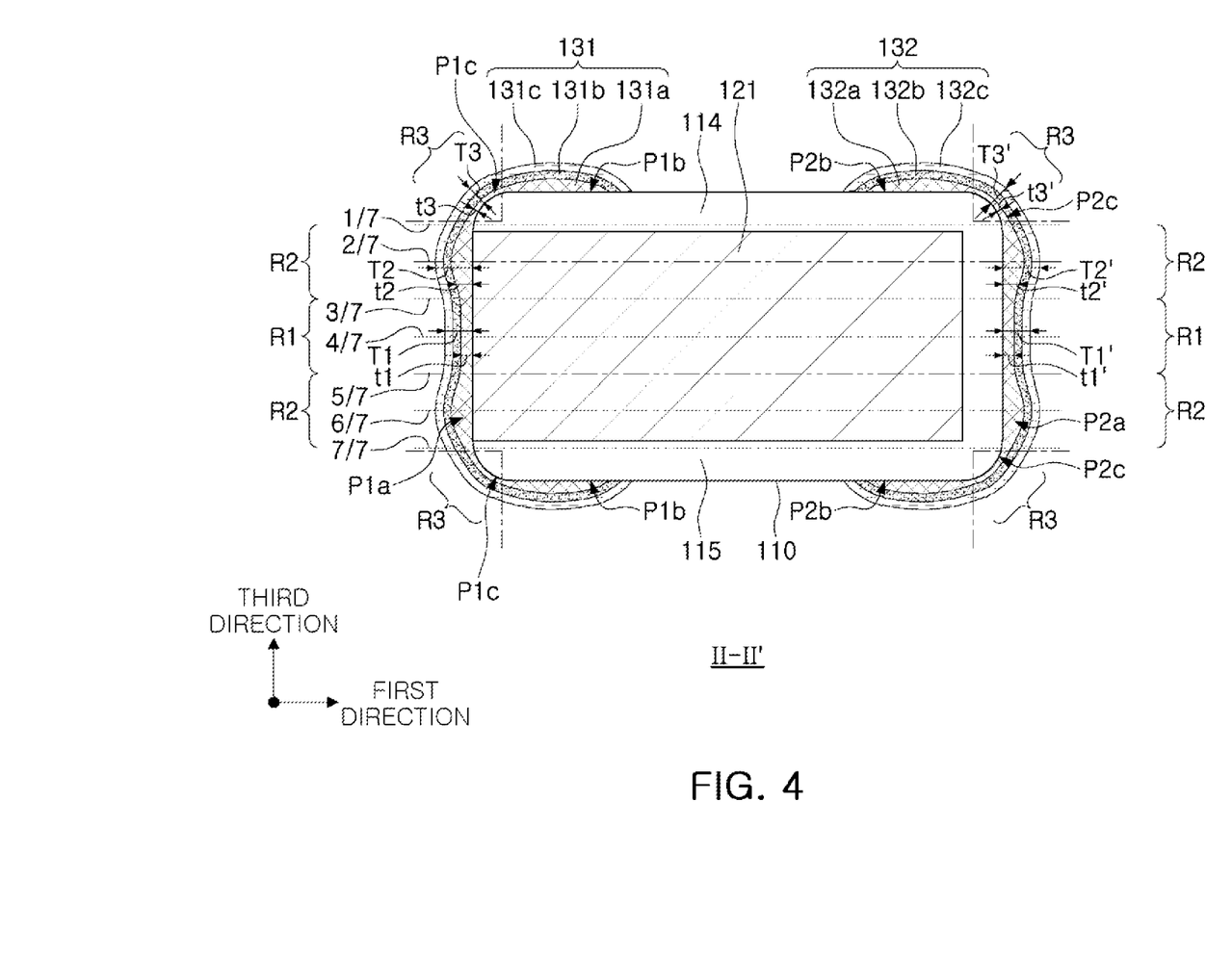
FIG. 4 is a cross-sectional view schematically illustrating a cross-section taken along line II-II' of FIG. 1.

FIG. 4 is a cross-sectional view schematically illustrating a cross-section taken along line II-II' of FIG. 1.

Figure 5:
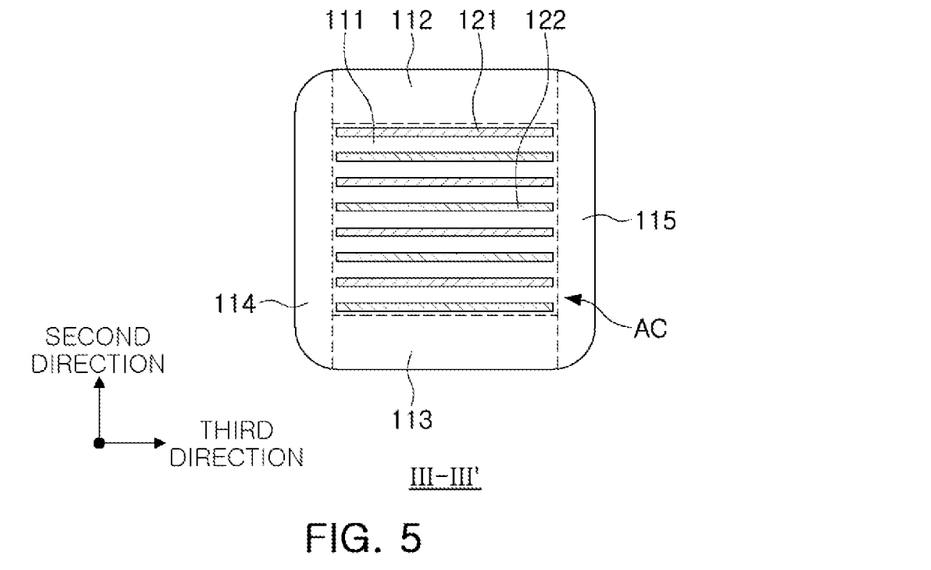
FIG. 5 is a cross-sectional view schematically illustrating a cross-section taken along line of FIG. 1.

FIG. 5 is a cross-sectional view schematically illustrating a cross-section taken along line III-III' of FIG. 1.

Figure 6:
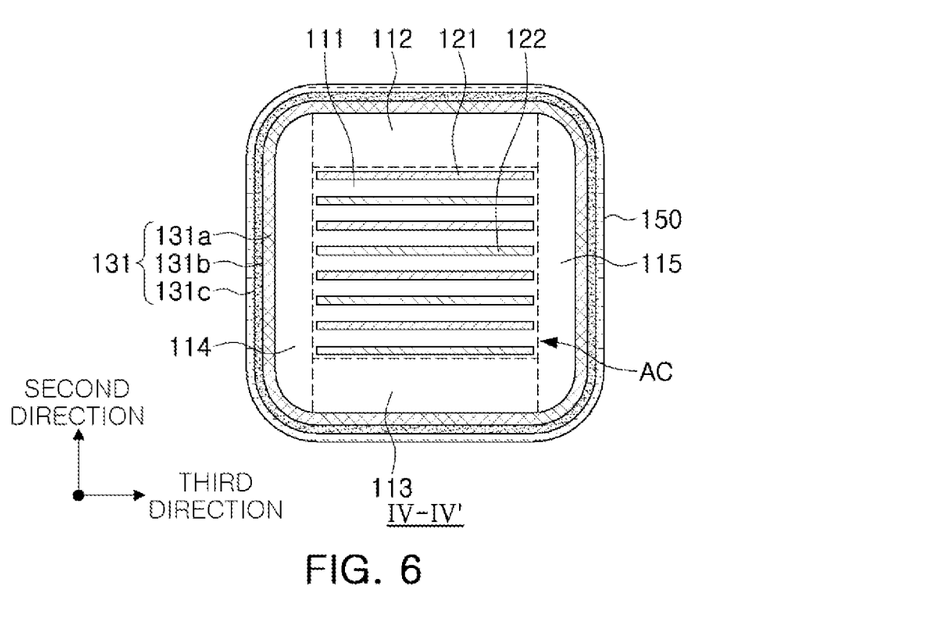
FIG. 6 is a cross-sectional view schematically illustrating a section taken along line IV-IV' of FIG. 1.

FIG. 6 is a cross-sectional view schematically illustrating a section taken along line IV-IV' of FIG. 1.

Referring to the drawings, a ceramic electronic component 100 according to an example includes a body 110 including a dielectric layer 111 and internal electrodes 121 and 122, and external electrodes 131 and 132 disposed on the body 110 and connected to the internal electrodes 121 and 122. In this case, maximum thicknesses T2 and T2' of the external electrodes 131 and 132 in a peripheral portion R2 may be greater than maximum thicknesses T1 and T1' in a center portion R1, respectively. In addition, the maximum thicknesses in the center portion R1 may be greater than maximum thicknesses T3 and T3' in a corner portion R3, respectively.

Meanwhile, a base electrode layer of an external electrode of a ceramic electronic component, for example, an MLCC chip may be formed by applying a dipping method. However, in this case, a phenomenon in which a conductive paste gathers in a center may occur. As described above, the convex shape generated by the conductive paste gathered in the center may not only decrease a thickness of a corner of the external electrode, but also increase a thickness thereof in a longitudinal direction. Accordingly, reliability may be deteriorated due to a break in plating at a corner, and there may be a limitation in securing effective capacity of a high-capacity MLCC. In addition, it may cause appearance defects due to measurement chamfering.

In addition, when the center portion of the external electrode has a convex shape, only horizontal mounting is possible, which may cause tombstone, which is one of poor plating shapes. Tombstone can occur when a vector force by a land is greater than gravity and an adhesion force of a solder between a chip end and the land. Causes of tombstone may be explained by an imbalance in an amount of solder, an imbalance of a length of the bands on both sides of the chip, an uneven solder position, an uneven land pattern, biased adhesion of the chip, and the like, which are particularly likely to occur during horizontal mounting.

On the other hand, in the ceramic electronic component 100 according to an example, by changing a coating method of the external electrodes 131 and 132 so that the conductive paste may be pushed to the outside when base electrode layers 131a and 132a of the external electrodes 131 and 132 are formed, a length size of the ceramic electronic component may be thinned, and in addition, a thickness of the external electrodes 131 and 132 may be increased to enable sealing. In addition, therethrough, a thickness of the external electrodes 131 and 132 in a peripheral region may be increased to be greater than a thickness thereof in a central region, thereby capable of being mounted vertically. Through such a change in shape and mounting direction, reliability may be improved by reducing defects in plating breakage, and at the same time, appearance defects caused by tombstone and measurement chamfering can be reduced.

Hereinafter, each configuration included in the ceramic electronic component 100 according to an example will be described in more detail.

A shape of the body 110 is not particularly limited, and may be a hexahedral shape or a shape similar to the hexahedral shape. Although the body 110 does not have a hexahedral shape having perfectly straight lines due to shrinkage of ceramic powder particles included in the body 110 in a sintering process, the body 110 may have a substantially hexahedral shape. An angular shape of the body 110, for example, a corner portion may be polished in a rounded manner in a polishing process, or the like.

The body 110 may have first and second surfaces 1 and 2 opposing each other in a length direction, third and fourth surfaces 3 and 4 connected to the first and second surfaces 1 and 2 and opposing each other in a thickness direction, and fifth and sixth surfaces 5 and 6 connected to the first and second surfaces 1 and 2, connected to the third and fourth surfaces 3 and 4, and opposing each other in a width direction.

In the body 110, a dielectric layer 111 and internal electrodes 121 and 122 may be alternately stacked. The plurality of dielectric layers 111 forming the body 110 may be in a sintered state, and boundaries between the adjacent dielectric layers 111 may be integrated to such an extent that such boundaries are difficult to determine without using a scanning electron microscope (SEM).

The dielectric layer 111 may be formed by sintering a ceramic green sheet including ceramic powder, an organic solvent, and an organic binder. The ceramic powder is a material having a high dielectric constant, and a barium titanate ($BaTiO_3$)-based material, a strontium titanate ($SrTiO_3$)-based material, or the like may be used, but an embodiment thereof is not limited thereto.

A thickness of the dielectric layer 111 does not need to be particularly limited, but in general, when the dielectric layer 111 is thinly formed to have a thickness of less than 0.6 μm, in particular, when the thickness of the dielectric layer 111 is 0.4 μm or less, reliability may be deteriorated. On the other hand, in the present disclosure, even when the thickness of the dielectric layer 111 is 0.4 μm or less, excellent reliability may be secured. Accordingly, when the thickness of the dielectric layer 111 is 0.4 μm or less, an effect of improving reliability according to the present disclosure may be more remarkable, and miniaturization and high capacitance of the ceramic electronic component may be more easily achieved.

The thickness of the dielectric layer 111 may refer to an average thickness of the dielectric layer 111 disposed between the internal electrodes 121 and 122. The average thickness of the dielectric layer 111 may be measured from an image obtained by scanning a cross-section of the body 110 in the length and thickness direction (L-T) with a scanning electron microscope (SEM) at a magnification of 10,000. More specifically, thicknesses of one dielectric layer may be measured at 30 points arranged at equal intervals in a length direction to obtain an average value of the measured thicknesses. The thicknesses of the dielectric layer measured at the 30 points arranged at the equal intervals may be designated in the active portion Ac, to be described later. In addition, if the average value is measured by extending the measurement of the average value to 10 dielectric layers 111, the average thickness of the dielectric layer 111 may be further generalized. Other measurement methods and/or tools appreciated by one of ordinary skill in the art, even if not described in the present disclosure, may also be used.

The body 110 may include an active portion Ac including a plurality of first internal electrodes 121 and a plurality of second internal electrodes 122 disposed to face each other with the dielectric layer 111 interposed therebetween and having capacitance formed therein. The active portion Ac, contributing to forming capacitance of a capacitor, and may be formed by repeatedly stacking the plurality of first and second internal electrodes 121 and 122 with the dielectric layer 111 interposed therebetween.

The body 110 may further include cover portions 112 and 113 disposed above and below the active portion Ac based on a thickness direction. The cover portions 112 and 113 may include a first cover portion 112 disposed above the active portion Ac and a second cover portion 113 disposed below the active portion Ac. The first cover portion 112 and the second cover portion 113 may be formed by stacking a single dielectric layer or two or more dielectric layers on upper and lower surfaces of the active portion Ac in a thickness direction, respectively, and may basically serve to prevent damage to the internal electrodes due to physical or chemical stress. The cover portions 112 and 113 may not include internal electrodes, and may include the same material as the dielectric layer 111. For example, the cover portions 112 and 113 may include a ceramic material, for example, may include the above-described barium titanate-based material. A thickness of the cover portions 112 and 113 does not need to be particularly limited. However, in order to more easily achieve miniaturization and high capacitance of the ceramic electronic component, the thickness of the cover portions 112 and 113 may be 20 μm or less.

The body 110 may further include margin portions 114 and 115 disposed on both side portions of the active portion Ac based on a width direction. The margin portions 114 and 115 may include a first margin portion 114 providing the fifth surface 5 of the body 110 and a second margin portion 115 providing the sixth surface 6 of the body 110. The margin portions 114 and 115 may refer to regions between both ends of the first and second internal electrodes 121 and 122 and a boundary surface of the body 110 in a cross-section of the body 110 cut in the width-thickness (W-T) direction. The margin portions 114 and 115 may basically serve to prevent damage to the internal electrodes 121 and 122 due to physical or chemical stress. The margin portions 114 and 115 may include the same or different material from that of the dielectric layer 111. For example, the margin portions 114 and 115 may be formed by applying a conductive paste onto the ceramic green sheet except for a place where margin portions are to be formed to form the internal electrodes. Alternately, in order to suppress a step difference by the internal electrodes 121 and 122, after it is cut so that the internal electrodes 121 and 122 are exposed after lamination, the margin portions 114 and 115 may also be formed by stacking a single dielectric layer or two or more dielectric layers on both side portions of the active portion Ac in a width direction.

The internal electrodes 121 and 122 may be alternately stacked with the dielectric layer 111. The internal electrodes 121 and 122 may include a plurality of first internal electrodes 121 and a plurality of second internal electrodes 122. The plurality of first internal electrodes 121 and the plurality of second internal electrodes 122 may be alternately disposed to face each other with the dielectric layer 111 interposed therebetween, and may be exposed to the first and second surfaces 1 and 2 of the body 110, respectively. For example, each of the plurality of first internal electrodes 121 may be spaced apart from the second surface 2 and exposed through the first surface 1. Also, each of the plurality of second internal electrodes 122 may be spaced apart from the first surface 1 and exposed through the second surface 2. The plurality of first internal electrodes 121 and the plurality of second internal electrodes 122 may be electrically separated from each other by the dielectric layer 111 disposed therebetween. The plurality of first internal electrodes 121 and the plurality of second internal electrodes 122 may be alternately stacked in the thickness direction, but an embodiment thereof is not limited thereto, and may be alternately stacked in the width direction.

The internal electrodes 121 and 122 may be formed of a conductive paste including a conductive metal. For example, the internal electrodes 121 and 122 may be printed by printing a conductive paste on the ceramic green sheet forming the dielectric layer 111 through a printing method such as a screen printing method, a gravure printing method, or the like. When the ceramic green sheet on which the internal electrodes 121 and 122 are printed is alternately and/or sintered, an active portion Ac of the body 110 may be formed. The conductive metal is not limited thereto, but may include nickel (Ni), copper (Cu), palladium (Pd), silver (Ag), gold (Au), platinum (Pt), tin (Sn), tungsten (W), titanium (Ti), and/or alloys thereof.

A thickness of the internal electrodes 121 and 122 does not need to be particularly limited, but in general, when the internal electrodes 121 and 122 are formed to have a thickness of less than 0.6 μm, in particular, the thickness of the internal electrodes 121 and 122 is 0.4 μm, reliability may be decreased. On the other hand, even when the thickness of the internal electrodes 121 and 122 is 0.4 μm or less in the present disclosure, excellent reliability can be secured. Therefore, when the thickness of the internal electrodes 121 and 122 is 0.4 μm or less, an effect of improving the reliability according to the present disclosure may be more remarkable, and miniaturization and high capacitance of the ceramic electronic component may be more easily achieved.

The thickness of the internal electrodes 121 and 122 may refer to an average thickness of the internal electrodes 121 and 122. The average thickness of the internal electrodes 121 and 122 may be measured from an image obtained by scanning a cross-section of the body 110 in the length and thickness direction (L-T) with a scanning electron microscope (SEM) at a magnification of 10,000. More specifically, thicknesses of one dielectric layer may be measured at 30 points arranged at equal intervals in a length direction to obtain an average value of the measured thicknesses. The thicknesses of the dielectric layer measured at the 30 points arranged at the equal intervals may be designated in the active portion Ac. In addition, if the average value is measured by extending the measurement of the average value to 10 internal electrodes, the average thickness of the internal electrodes may be further generalized. Other measurement methods and/or tools appreciated by one of ordinary skill in the art, even if not described in the present disclosure, may also be used.

The external electrodes 131 and 132 may be disposed on the first surface 1 and the second surface 2 of the body 110, such that a portion of the external electrodes 131 and 132 may extend to the third surface 3, the fourth surface 4, the fifth surface 5, and the sixth surface 6, respectively. The external electrodes 131 and 132 may include a first external electrode 131 and a second external electrode 132 respectively connected to the plurality of first internal electrodes 121 and the plurality of second internal electrodes 122. The first external electrode 131 may be disposed on the first surface 1 of the body 110, such that a portion of the first external electrode 131 may extend to the third surface 3, the fourth surface 4, the fifth surface 5, and the sixth surface 6, respectively. The second external electrode 132 may be disposed on the second surface 2 of the body 110, such that a portion of the second external electrode 132 may extend to the third surface 3, the fourth surface 4, the fifth surface 5, and the sixth surface 6, respectively. However, the present disclosure is not limited thereto, and the number or shape of the external electrodes 131 and 132 may be changed according to the shape or other purpose of the internal electrodes 121 and 122.

In at least one, preferably both, of the external electrodes 131 and 132, in a cross-section in length and thickness directions and/or a cross-section in length and width directions, when a maximum thickness in a center portion R1 of the first surface 1 and the second surface 2 is T1 and T1', respectively, a maximum thickness in a peripheral portion R2 surrounding the center portion of the first surface 1 and the second surface 2 is T2 and T2', respectively, and a maximum thickness in a corner portion R3 in which the first surface 1 and the second surface 2 are connected to the third surface 3, the fourth surface 4, the fifth surface 5, and the sixth surface is T3 and T3', respectively, T2>T1 and/or T2'>T1' may be satisfied. More preferably, T1>T3 and/or T1'>T3' may be further satisfied. In this case, the length size of the ceramic electronic component 100 may be reduced. In addition, the sealing effect of the external electrodes 131 and 132 may be more excellent. In addition, the external electrodes 131 and 132 may have a form capable of vertical mounting. Accordingly, it is possible to improve reliability by reducing defects in plating breakage, and reduce appearance defects caused by tombstone and measurement chamfering.

Meanwhile, the cross-section in length and thickness directions and the cross-section in length and width directions may be cross-sections when cut so that a ½ point is exposed, based on a width direction and a thickness direction, respectively. In this case, in the cross-section in length and thickness directions and the cross-section in length and width directions, when 7 division lines are drawn at uniform intervals except for the corner portion R3, approximately from a 3/7 point to a 5/7 point may be a center portion R1, and approximately from a 1/7 point to a 3/7 point and approximately from a 5/7 point to a 7/7 point may be a peripheral portion R2. The center portion R1, the peripheral portion R2, and the corner portion R3 may be a center region, a side region, and a corner region, respectively. However, the present disclosure is not limited thereto, the center portion R1 may be a flat region in which the thicknesses of the external electrodes 131 and 132 are substantially constant, and the peripheral portion R2 may be a convex region in which the thicknesses of the external electrodes 131 and 132 increases and then decreases, so that a boundary point between the center portion R1 and the peripheral portion R2 may be flexibly changed at the 3/7 point and the 5/7 point.

The maximum thicknesses T1, T2, T3 and T1', T2', T3' in the center portion R1, the peripheral portion R2, and the corner portion R3 of the external electrodes 131 and 132 may be measured from an image obtained by scanning a cross-section of the ceramic electronic component 100 in length and thickness directions and/or a cross-section thereof in length and width directions with a scanning electron microscope (SEM) at a magnification of 3,000. Other measurement methods and/or tools appreciated by one of ordinary skill in the art, even if not described in the present disclosure, may also be used.

The external electrodes 131 and 132 may be formed of any material as long as they have electrical conductivity, such as metal, or the like, and a specific material may be determined in consideration of electrical characteristics, structural stability, and the like, and may further have a multilayer structure. For example, the external electrodes 131 and 132 may include base electrode layers 131a and 131b disposed on the body 110, resin electrode layers 131b and 132b disposed on the base electrode layers 131a and 132a and cover the same, and plating electrode layers 131c and 132c disposed on the resin electrode layers 131b and 132b and cover the same. However, an embodiment thereof is not limited thereto, the resin electrode layers 131b and 132b and/or the plating electrode layers 131c and 132c may be omitted.

The base electrode layers 131a and 132a may be, for example, sintered electrodes including a conductive metal and glass. The base electrode layers 131a and 132a may be formed by applying a conductive paste including a conductive metal and glass to the body 110 and then sintering the same. For example, in order to have a form capable of vertical mounting, the conductive paste may be applied by being divided into a plurality of times and then sintered. After sintering and/or firing, they may be integrated so that boundaries within the base electrode layers 131a and 132a may be unclear. For example, each of the base electrode layers 131a and 132a may be a single electrode layer. For example, the conductive metal may include copper (Cu), nickel (Ni), palladium (Pd), platinum (Pt), gold (Au), silver (Ag), lead (Pb) and/or an alloy containing the same, and may include, preferably copper (Cu), but an embodiment thereof is not limited thereto.

In at least one, preferably both, of base electrode layers 131a and 132a, in a cross-section in length and thickness directions and/or a cross-section in length and width directions, when a maximum thickness in a center portion R1 of the first surface 1 and the second surface 2 is T1 and T1', respectively, a maximum thickness in a peripheral portion R2 surrounding the center portion R1 of the first surface 1 and the second surface 2 is T2 and T2', respectively, and a maximum thickness in a corner portion R3 in which the first surface 1 and the second surface 2 are connected to the third surface 3, the fourth surface 4, the fifth surface 5, and the sixth surface is T3 and T3', respectively, t2>t1 and/or t2'>t1' may be satisfied. More preferably, t1>t3 and/or t1'>t3' may be further satisfied. In this case, the external electrodes 131 and 132 may effectively satisfy T1, T2, T3 and/or T1', T2', and T3'.

Maximum thicknesses t1, t2, t3, and t1', t2', t3' in each of the center portion R1, the peripheral portion R2, and the corner portion R3 of the base electrode layers 131a and 132a may be measured by scanning an image of a cross-section of the ceramic electronic component 100 in length and thickness directions and a cross-section thereof in length and width directions with a scanning electron microscope at 3,000 magnification, respectively.

The first base electrode layer 131a may include a first connection portion P1a disposed in the center portion R1 and the peripheral portion R2 of the first surface 1, a first band portion P1b disposed on a portion of each of the fifth and sixth surfaces 5 and 6, and a first corner portion P1c connecting the first connection portion P1a and the first band portion P1b. In this case, the first corner portion P1c may have a round shape. In addition, in a cross section thereof in length and thickness directions and/or a cross-section in length and width directions, a maximum thickness t2 of the first connection portion P1a in the peripheral portion R2 may be greater than the maximum thickness t1 in the center portion R1. In addition, the maximum thickness t1 of the center portion R1 of the first connection portion P1a may be greater than the maximum thickness t3 of the first corner portion P1c. Preferably, t2/t1 may be 1.1 to 1.4, for example, 1.13 to 1.34, and t3/t1 may be 0.2 to 0.5, but an embodiment thereof is not limited thereto.

The second base electrode layer 132a may include a second connection portion P2a disposed in the center portion R1 and the peripheral portion R2 of the second surface 2, a second band portion P2b disposed on a portion of each of the fifth and sixth surfaces 5 and 6, and a second corner portion P2c connecting the second connection portion P2a and the second band portion P2b. In this case, the second corner portion P2c may have a round shape. In addition, in a cross section thereof in length and thickness directions and/or a cross-section in length and width directions, a maximum thickness t2' of the second connection portion P2a in the peripheral portion R2 may be greater than the maximum thickness t1' in the center portion R1. In addition, the maximum thickness t2' of the center portion R1 of the second connection portion P2a may be greater than the maximum thickness t3' of the second corner portion P2c. Preferably, t2'/t1' may be 1.1 to 1.4, for example, 1.13 to 1.34, and t3'/t1' may be 0.2 to 0.5, but an embodiment thereof is not limited thereto.

The resin electrode layers 131b and 132b may be resin-based electrodes including, for example, a conductive metal and a resin. The resin electrode layers 131b and 132b may be formed by applying and curing a paste including a conductive metal and a resin. As the conductive metal included in the resin electrode layers 131b and 132b, a material having excellent electrical conductivity may be used, but an embodiment thereof is not limited thereto. For example, the conductive metal may include copper (Cu), nickel (Ni), palladium (Pd), platinum (Pt), gold (Au), silver (Ag), lead (Pb) and/or alloys thereof, preferably, and may include copper and/or nickel (Ni), but an embodiment thereof is not limited thereto. As the resin included in the resin electrode layers 131b and 132b, an insulating resin may be used, and an embodiment thereof is not particularly limited. For example, the resin may include an epoxy resin, but an embodiment thereof is not limited thereto.

The first resin electrode layer 131b may be disposed on the first base electrode layer 131a to cover the first base electrode layer 131a, and a portion of an end portion thereof may be in contact with the third surface 3, the fourth surface 4, The fifth surface 5 and the sixth surface 6, respectively, but the present disclosure is not limited thereto.

The second resin electrode layer 132b may be disposed on the second base electrode layer 132a to cover the second base electrode layer 132a, and a portion of an end portion thereof may be in contact with the third surface 3, the fourth surface 4, The fifth surface 5 and the sixth surface 6, respectively, but the present disclosure is not limited thereto.

The plating electrode layers 131c and 132c may improve mounting characteristics. The type of the plating electrode layers 131c and 132c is not particularly limited, and may be a plating layer including nickel (Ni), tin (Sn), palladium (Pd) and/or an alloy containing the same, and may be formed of a plurality of layers. The plating electrode layers 131c and 132c may be, for example, a nickel (Ni) plating layer or a tin (Sn) plating layer, or have a form in which a nickel (Ni) plating layer and a tin (Sn) plating layer are sequentially formed. In addition, the plating electrode layers 131c and 132c may include a plurality of nickel (Ni) plating layers and/or a plurality of tin (Sn) plating layers.

The first plating electrode layer 131c may be disposed on the first resin electrode layer 131b and cover the same, and a portion of an end portion thereof may be in contact with the third surface 3, the fourth surface 4, the fifth surface 5, and the sixth surface 6, respectively, but an embodiment of the present disclosure is not limited thereto. The first plating electrode layer 131c may include a nickel (Ni) plating layer disposed on the first resin electrode layer 131b and a tin (Sn) plating layer disposed on the nickel (Ni) plating layer.

The second plating electrode layer 132c may be disposed on the second resin electrode layer 132b and cover the same, and a portion of an end portion thereof may be in contact with the third surface 3, the fourth surface 4, the fifth surface 5, and the sixth surface 6, respectively, but an embodiment of the present disclosure is not limited thereto. The second plating electrode layer 132c may include a nickel (Ni) plating layer disposed on the second resin electrode layer 132b and a tin (Sn) plating layer disposed on the nickel (Ni) plating layer, but an embodiment of the present disclosure is not limited thereto.

Figure 7:
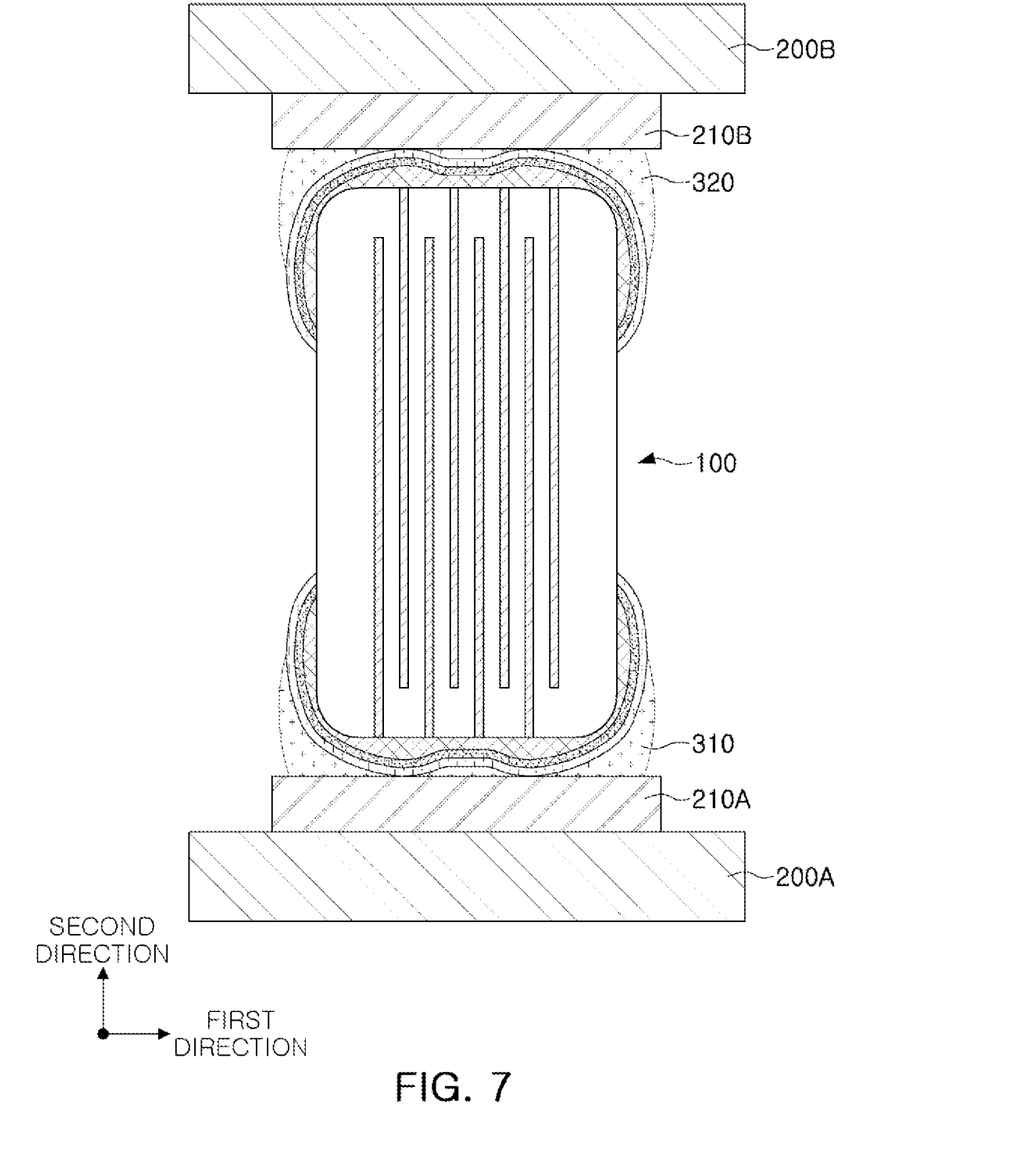
FIG. 7 is a cross-sectional view schematically illustrating vertical mounting of the ceramic electronic component of FIG. 1.

FIG. 7 is a cross-sectional view schematically illustrating vertical mounting of the ceramic electronic component of FIG. 1.

Referring to FIG. 7, the ceramic electronic component 100 according to an example may be mounted vertically between electrode pads 210A and 210B of printed circuit boards 200A and 200B through conductive adhesives 310 and 320 such as solder. For example, the ceramic electronic component 100 according to an example may be vertically rotated so that a thickness direction becomes a first direction and a length direction becomes a second direction, and may be mounted between the printed circuit boards 200A and 200B.

As described above, since the ceramic electronic component 100 according to an example has external electrodes 131 and 132 for easy vertical mounting, reliability can be improved by reducing defects in plating breakage, and appearance defects due to tombstone defect and measurement chamfering can be reduced.

As described above, since the ceramic electronic component 100 according to an example has external electrodes 131 and 132 for easy vertical mounting, reliability can be improved by reducing defects in plating breakage, and appearance defects due to tombstone defect and measurement chamfering can be reduced.

Figure 8:
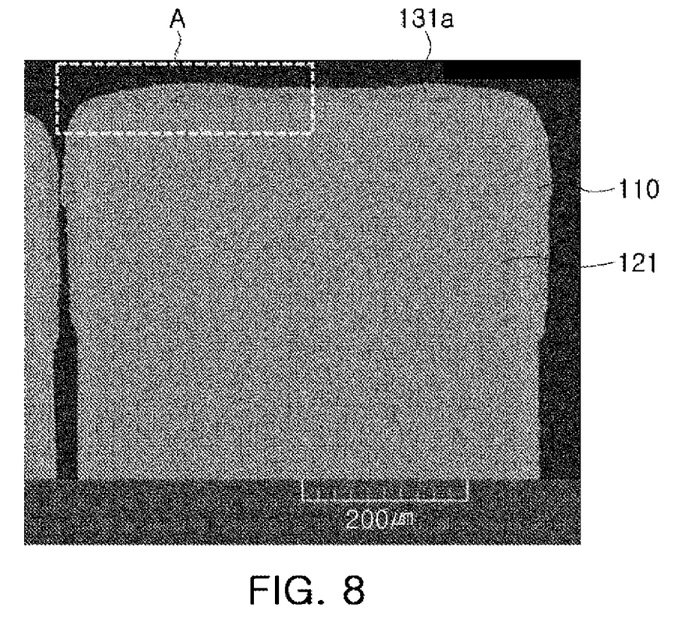
FIG. 8 is a cross-sectional image taken using a scanning electron microscope (SEM) of a length-width direction cross-section of a ceramic electronic component according to an example.

FIG. 8 is a cross-sectional image of a cross-section of a ceramic electronic component according to an example in a length-width direction, captured using a scanning electron microscope (SEM).

Figure 9:
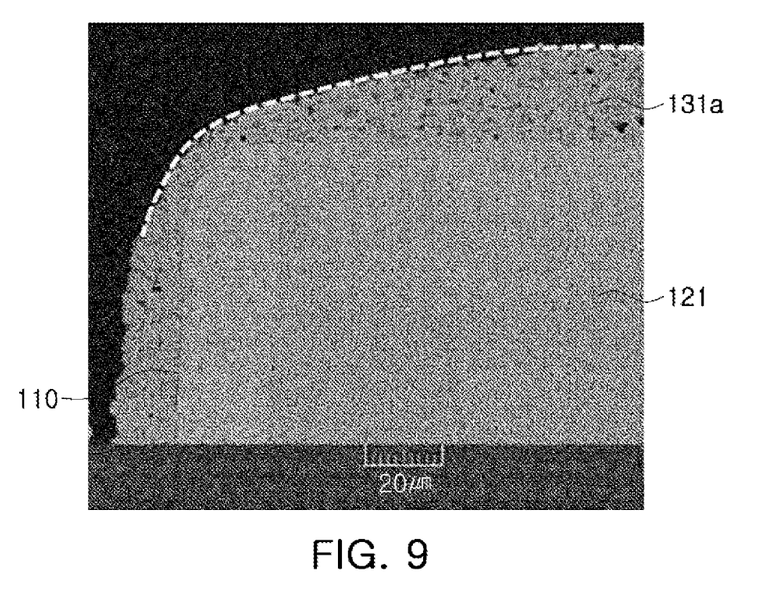
FIGS. 9 and 10 are cross-sectional images taken using SEM by further magnifying region A of the ceramic electronic component of FIG. 8.
Figure 10:
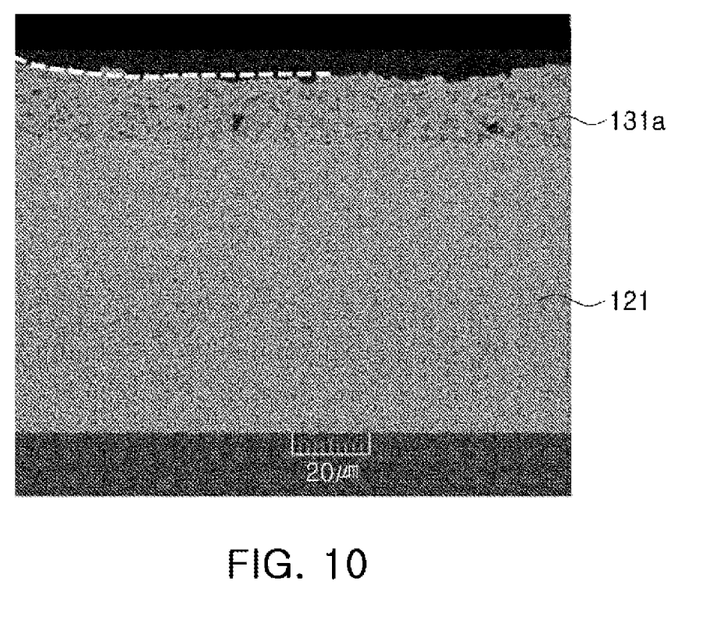

FIGS. 9 and 10 are cross-sectional images of the ceramic electronic component of FIG. 8, captured using SEM by further magnifying area A of the ceramic electronic component of FIG. 8.

Referring to the drawings, the ceramic electronic component according to an example may have a form capable of being mounted vertically, in which a thickness of a first base electrode layer 131a in a peripheral region of a head surface of the body 110 is greater than a thickness thereof in a central region, and a thickness in a central region of a head surface of the body 100 is greater than a thickness in a corner region connecting a head surface and a band surface of the body 110, which may be the same for a second base electrode layer 132a. In this case, as described above, a length size of the ceramic electronic component may be reduced, and a corner thickness of the external electrode may be increased to enable sealing. Through such a change in shape and mounting direction, reliability can be improved by reducing defects in plating breakage, and at the same time, appearance defects caused by tombstone and measurement chamfering can be reduced.

Experimental Example

[Table 1] below shows results of manufacturing a ceramic electronic component 100 according to an example by variously manufacturing by varying a thickness of base electrode layers 131a and 132a, and then measuring t1, t2, and t3. Meanwhile, for t1, t2, and t3, an image may be obtained by scanning a cross-section of each sample in length and thickness directions and a cross-section in the length and width directions with a scanning electron microscope at 3,000 magnification, respectively, and a thickest thickness thereof were measured in each region and shown.

TABLE 1

| Classification | t1 (µm) | t2 (µm) | t3 (µm) | t2/t1 | t3/t1 |
|---|---|---|---|---|---|
| 1 | 17.45 | 22.06 | 5.22 | 1.264 | 0.299 |
| 2 | 18.7 | 21.22 | 5.04 | 1.135 | 0.270 |
| 3 | 18.41 | 21.19 | 6.8 | 1.151 | 0.369 |
| 4 | 18.59 | 23.15 | 6.17 | 1.245 | 0.332 |
| 5 | 19.49 | 24.51 | 6.74 | 1.258 | 0.346 |
| 6 | 18.03 | 22.05 | 6.69 | 1.223 | 0.371 |
| 7 | 17.65 | 20.85 | 6.91 | 1.181 | 0.392 |
| 8 | 19.09 | 23.25 | 7.68 | 1.218 | 0.402 |
| 9 | 18.21 | 21.13 | 7.3 | 1.160 | 0.391 |
| 10 | 17.45 | 19.76 | 4.39 | 1.132 | 0.252 |
| 11 | 16.66 | 18.89 | 6.32 | 1.134 | 0.379 |
| 12 | 17.56 | 20.34 | 5.37 | 1.158 | 0.306 |
| 13 | 18.9 | 22.43 | 5.69 | 1.187 | 0.301 |
| 14 | 18.2 | 23.06 | 5.03 | 1.267 | 0.276 |
| 15 | 18.78 | 21.25 | 5.57 | 1.132 | 0.295 |
| 16 | 17.34 | 19.88 | 6.17 | 1.146 | 0.356 |
| 17 | 18.5 | 23.62 | 6.57 | 1.277 | 0.351 |
| 18 | 18.41 | 22.58 | 5.97 | 1.227 | 0.324 |
| 19 | 18.59 | 21.95 | 7.97 | 1.181 | 0.429 |
| 20 | 19.49 | 24.04 | 4.85 | 1.233 | 0.249 |
| 21 | 18.03 | 24.11 | 5.8 | 1.337 | 0.322 |
| 22 | 17.65 | 21.16 | 5.66 | 1.199 | 0.321 |
| 23 | 18.55 | 22.34 | 6.07 | 1.204 | 0.327 |
| 24 | 19.31 | 22.52 | 5.26 | 1.166 | 0.259 |
| 25 | 19.87 | 23.11 | 5.17 | 1.163 | 0.260 |
| 26 | 17.58 | 20.48 | 5.9 | 1.165 | 0.336 |
| 27 | 19.15 | 21.71 | 6.44 | 1.134 | 0.335 |
| 28 | 18.62 | 21.11 | 5.54 | 1.134 | 0.296 |
| 29 | 17.62 | 21.66 | 6.48 | 1.229 | 0.368 |
| 30 | 17.85 | 20.57 | 5.88 | 1.152 | 0.329 |

As can be seen from [Table 1], in the ceramic electronic component 100 according to an example, the first base electrode layer 131a may satisfy a thickness relationship of t1, t2, and t3 described above. Meanwhile, in [Table 1], t1, t2, and t3 were measured and shown, but since the second base electrode layer 131b-132a may also be formed in the same manner as the first base electrode layer 131a, t1', t2', and t3' of Samples 1 to 30 may have values, similar to t1, t2, and t3 of Samples 1 to 30, and accordingly, the second base electrode layer 132a may also satisfy the thickness relationship of t1', t2', and t3 described above.

In this case, as a result, the external electrodes 131 and 132 may satisfy the relationships of T1, T2, T3 and T1', T2', and T3' described above. For example, even if resin electrode layers 131b and 132b and/or plating electrode layers 131c and 132c are further formed on the base electrode layers 131a and 132a, the external electrodes 131 and 132 may be formed to have a uniform thickness to some extent, respectively, so that the external electrodes 131 and 132 may have similar shapes as the shape of the base electrode layers 131a and 132, and as a result, the above-described relationship of T1, T2, T3 and T1', T2', and T3' may be satisfied. Accordingly, the length size of the ceramic electronic component 100 may be reduced, and a sealing effect of the external electrodes 131 and 132 may be improved. In addition, the external electrodes 131 and 132 may have a form capable of vertical mounting.

On the other hand, [Table 2] below shows results by measuring thicknesses of d1 and d3 corresponding to t1 and t3 after variously manufacturing a ceramic electronic component in which a base electrode layer having a convex center portion is formed by a dipping method. These thicknesses were also shown by measuring a thickest thickness in each region after obtaining an image by scanning a cross-section of each sample in length and thickness directions and a cross-section in the length and width directions with a scanning electron microscope at 3,000 magnification, respectively.

TABLE 2

| Classi-fication | d1 (μm) | d3 (μm) | d3/d1 |
| --- | --- | --- | --- |
| 31 | 21.26 | 1.15 | 0.054 |
| 32 | 21.07 | 1.5 | 0.071 |
| 33 | 22.2 | 1.32 | 0.059 |
| 34 | 21.63 | 1.43 | 0.066 |
| 35 | 22.01 | 1.47 | 0.067 |
| 36 | 22.11 | 1.51 | 0.068 |
| 37 | 21.44 | 1.62 | 0.076 |
| 38 | 22.06 | 2.15 | 0.097 |
| 39 | 21.22 | 2.25 | 0.106 |
| 40 | 21.19 | 1.84 | 0.087 |
| 41 | 23.15 | 1.62 | 0.070 |
| 42 | 24.51 | 2.9 | 0.118 |
| 43 | 22.05 | 1.49 | 0.068 |
| 44 | 20.85 | 1.81 | 0.087 |
| 45 | 22.25 | 2.62 | 0.118 |
| 46 | 21.13 | 2.34 | 0.111 |
| 47 | 19.76 | 2.69 | 0.136 |
| 48 | 18.79 | 2.1 | 0.112 |
| 49 | 20.34 | 1.08 | 0.053 |
| 50 | 22.43 | 2.41 | 0.107 |
| 51 | 23.06 | 0.87 | 0.038 |
| 52 | 21.25 | 1.03 | 0.048 |
| 53 | 20.55 | 2.84 | 0.138 |
| 54 | 20.31 | 1.37 | 0.067 |
| 55 | 20.98 | 0.55 | 0.026 |
| 56 | 20.06 | 2.78 | 0.139 |
| 57 | 21.63 | 1.49 | 0.069 |
| 58 | 21.05 | 2.55 | 0.121 |
| 59 | 20.88 | 2.07 | 0.099 |
| 60 | 21.11 | 3.02 | 0.143 |

As can be seen from [Table 2], a ceramic electronic component in which abase electrode layer having a convex shape is formed by dipping may reduce a thickness of a corner of an external electrode, and increase a thickness thereof in a longitudinal direction. Accordingly, reliability may be deteriorated due to a break in plating at a corner, and there may be a limitation in securing effective capacity of a high-capacity MLCC. In addition, it may cause an appearance defect due to measurement chamfering. In addition, when the center portion of the external electrode has a convex shape, only horizontal mounting may be performed, which may cause a tombstone, a type of poor plating shape.

Although a multilayer ceramic capacitor has been described as an example of a ceramic electronic component in the present disclosure, an embodiment of the present disclosure is not limited thereto, and the present disclosure may be applied to other types of ceramic electronic components, for example, an inductor, a piezoelectric element, a varistor, a thermistor, and the like.

As set forth above, as one effect among various effects of the present disclosure, a ceramic electronic component capable of being thinned may be provided.

As another effect among various effects of the present disclosure, a ceramic electronic component capable of reliability deterioration, measurement chamfering, and tombstone may be provided.

As another effect among various effects of the present disclosure, a ceramic electronic component capable of being mounted vertically may be provided.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items. It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

However, various and advantageous advantages and effects of the present disclosure are not limited to the above description, and will be more readily understood in the process of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A ceramic electronic component, comprising:
a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode disposed on the first surface, and extending onto a portion of each of the third to sixth surfaces; and
a second external electrode disposed on the second surface, and extending onto a portion of each of the third to sixth surfaces,
wherein, in at least one of cross-sections in first and second directions or in first and third directions, when maximum thicknesses of the first and second external electrodes at center portions of the first and second surfaces are defined as T1 and T1', respectively, maximum thicknesses of the first and second external electrodes at peripheral portions of the first and second surfaces are defined as T2 and T2', respectively, and maximum thicknesses of the first and second external electrodes at corner portions, in which the first and second surfaces are connected to the third to sixth surfaces, are defined as T3 and T3', respectively, at least one of T2>T1>T3 or T2'>T1'>T3' is satisfied.

2. The ceramic electronic component of claim 1, wherein T2>T1>T3 and T2'>T1'>T3' are satisfied for both of the first and second external electrodes.

3. The ceramic electronic component of claim 1, wherein the first external electrode comprises a first base electrode layer disposed on the first surface and extending onto a portion of each of the third to sixth surfaces,
  wherein the second external electrode comprises a second base electrode layer disposed on the second surface and extending onto a portion of each of the third to sixth surfaces, and
  wherein the first and second base electrode layers include a conductive metal and glass.

4. The ceramic electronic component of claim 3, wherein the conductive metal comprises copper (Cu).

5. The ceramic electronic component of claim 3, wherein, in at least one of cross-sections in the first and second directions or the first and third directions, when maximum thicknesses of the first and second base electrode layers at the center portions of the first and second surfaces are defined as t1 and t1', respectively, maximum thicknesses of the first and second base electrode layers at the peripheral portions of the first and second surfaces are defined as t2 and t2', respectively, and maximum thicknesses of the first and second base electrode layers at the corner portions are defined as t3 and t3', respectively, at least one of t2>t1>t3 or t2'>t1'>t3' is satisfied.

6. The ceramic electronic component of claim 5, wherein t2>t1>t3 and t2'>t1'>t3' are satisfied for both of the first and second base electrode layers.

7. The ceramic electronic component of claim 5, wherein each of the first and second base electrode layers is a single electrode layer.

8. The ceramic electronic component of claim 3, wherein the first external electrode further comprises a first resin electrode layer disposed on the first base electrode layer and covering the first base electrode layer,
  wherein the second external electrode further comprises a second resin electrode layer disposed on the second base electrode layer and covering the second base electrode layer, and
  wherein the first and second resin electrode layers include a conductive metal and a resin.

9. The ceramic electronic component of claim 8, wherein the conductive metal comprises copper (Cu), and
  wherein the resin comprises an epoxy resin.

10. The ceramic electronic component of claim 8, wherein the first external electrode further comprises a first plating electrode layer disposed on the first resin electrode layer and covering the first resin electrode layer,
  wherein the second external electrode further comprises a second plating electrode layer disposed on the second resin electrode layer and covering the second resin electrode layer, and
  wherein the first and second plating electrode layers include a conductive metal.

11. The ceramic electronic component of claim 10, wherein the first and second plating electrode layers has a multilayer structure including a first layer including nickel (Ni) as a conductive metal and a second layer including tin (Sn) as a conductive metal.

12. A ceramic electronic component, comprising:
  a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction;
  a first external electrode including a first connection portion disposed on a first center region and a first peripheral region of the first surface, a first band portion disposed on a portion of each of the third to sixth surfaces, and a first corner portion connecting the first connection portion and the first band portion; and
  a second external electrode including a second connection portion disposed on a second center region and a second peripheral region of the second surface, a second band portion disposed on a portion of each of the third to sixth surfaces, and a second corner portion connecting the second connection portion and the second band portion,
  wherein, in at least one of cross-sections in first and second directions or in first and third directions, maximum thicknesses of the first and second connection portions at the first and second peripheral regions are greater than maximum thicknesses of the first and second connection portions at the first and second center regions, respectively, and
  wherein each of the first and second external electrodes is a single electrode layer.

13. The ceramic electronic component of claim 11, wherein, when the maximum thicknesses of the first and second connection portions at the first and second center regions are defined as t1 and t1', respectively, the maximum thickness in the first and second peripheral regions of the first and second connection portions are defined as t2 and t2', respectively, and the maximum thickness in the first and second corner portions are defined as t3 and t3', respectively, the first and second external electrodes satisfy t2>t1>t3 and t2'>t1'>t3', respectively.

14. The ceramic electronic component of claim 13, wherein the first and second external electrodes have t2/t1 and t2'/t1' of 1.1 to 1.4, respectively.

15. The ceramic electronic component of claim 13, wherein the first and second external electrodes have t3/t1 and t3'/t1' of 0.2 to 0.5, respectively.

16. The ceramic electronic component of claim 11, wherein the first and second external electrodes comprise a conductive metal and glass, and
  wherein the conductive metal includes copper (Cu).

17. A ceramic electronic component, comprising:
  a body including a dielectric layer and a plurality of first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction;

a first external electrode disposed on the first surface, and extending onto a portion of at least one of the third to sixth surfaces; and a second external electrode disposed on the second surface, and extending onto a portion of the at least one of the third to sixth surfaces, wherein, when maximum thicknesses of the first and second external electrodes at center portions of the first and second surfaces are defined as T1 and T1', respectively, maximum thicknesses at peripheral portions of the first and second surfaces are defined as T2 and T2', respectively, and maximum thicknesses at corner portions, in which the first and second surfaces are connected to the at least one of the third to sixth surfaces, are defined as T3 and T3', respectively, at least one of a condition (T2 is greater than T1 and T3) or a condition (T2' is greater than T1' and T3') is satisfied, the first external electrode comprises a first base electrode layer disposed on the first surface and extending onto the portion of the at least one of the third to sixth surfaces, the second external electrode comprises a second base electrode layer disposed on the second surface and extending onto the portion of the at least one of the third to sixth surfaces, when maximum thicknesses of the first and second base electrode layers at the center portions of the first and second surfaces are defined as t1 and t1', respectively, maximum thicknesses of the first and second base electrode layers at the peripheral portions of the first and second surfaces are defined as t2 and t2', respectively, and maximum thicknesses of the first and second base electrode layers at the corner portions are defined as t3 and t3', respectively, at least one of a condition (t2 is greater than t1 and t3) or a condition (t2' is greater than t1' and t3') is satisfied, and at least one of t1>t3 or t1'>t3' is further satisfied.

18. The ceramic electronic component of claim 17, wherein at least one of T1>T3 or T1'>T3' is further satisfied.

19. The ceramic electronic component of claim 17, wherein the first external electrode comprises a first base electrode layer and a first resin electrode layer that are sequentially arranged from the body, and the second external electrode comprises a second base electrode layer and a second resin electrode layer that are sequentially arranged from the body.

* * * * *